United States Patent [19]

Okitsu

[11] Patent Number: 5,245,199

[45] Date of Patent: Sep. 14, 1993

[54] MARK DETECTING APPARATUS USING ACTIVE THRESHOLD COMPARISON

[75] Inventor: Katsuhiko Okitsu, Yokohama, Japan

[73] Assignee: Canon Kabushiki Kaisha, Tokyo, Japan

[21] Appl. No.: 932,544

[22] Filed: Aug. 20, 1992

[30] Foreign Application Priority Data

Aug. 23, 1991 [JP] Japan .................... 3-237121

[51] Int. Cl.[5] .......................... G01N 21/86
[52] U.S. Cl. .................... 250/561; 250/570; 353/26 A
[58] Field of Search ............... 250/561, 570, 566, 557, 250/548; 353/26 A, 26 R; 235/454, 463

[56] References Cited

U.S. PATENT DOCUMENTS 4,207,473 6/1980 Nakatani et al. ............. 250/570
4,219,737 8/1980 Gagnon et al. ............. 250/570

Primary Examiner—David C. Nelms
Assistant Examiner—K. Shami

Attorney, Agent, or Firm—Fitzpatrick, Cella, Harper & Scinto

[57] ABSTRACT

A mark detecting apparatus comprises an illuminator means for illuminating a film with marks having density different from the density of its periphery, a plurality of photosensors arranged in the feeding direction of the film, which serve as light receivers for receiving the transmitting light of the film illuminated by the illuminator means to detect the presence of marks, setting device for establishing a reference value on the basis of the maximum value and quasimaximal value among each of the output signals of the photosensors, and discriminator for discriminating the presence of marks by comparing the reference value established by the setting device and the output of the light receivers. With the structure thus arranged, it is possible to establish the binalizing reference value of the photosensors accurately even when the fluctuation of the luminous energy of the light source occurs as well as to correctly establish the reference value reliably even when the base density of the film varies.

7 Claims, 12 Drawing Sheets

MARK DETECTING APPARATUS USING ACTIVE THRESHOLD COMPARISON

BACKGROUND OF THE INVENTION

1. Field of the Invention

The present invention relates to a mark detecting apparatus applicable to a microfilm retrieving apparatus for feeding an elongated microfilm to retrieve a given image frame of such a microfilm. More particularly, it relates to a mark detecting apparatus having a plurality of light receiving means.

2. Related Background Art

Figure 12:
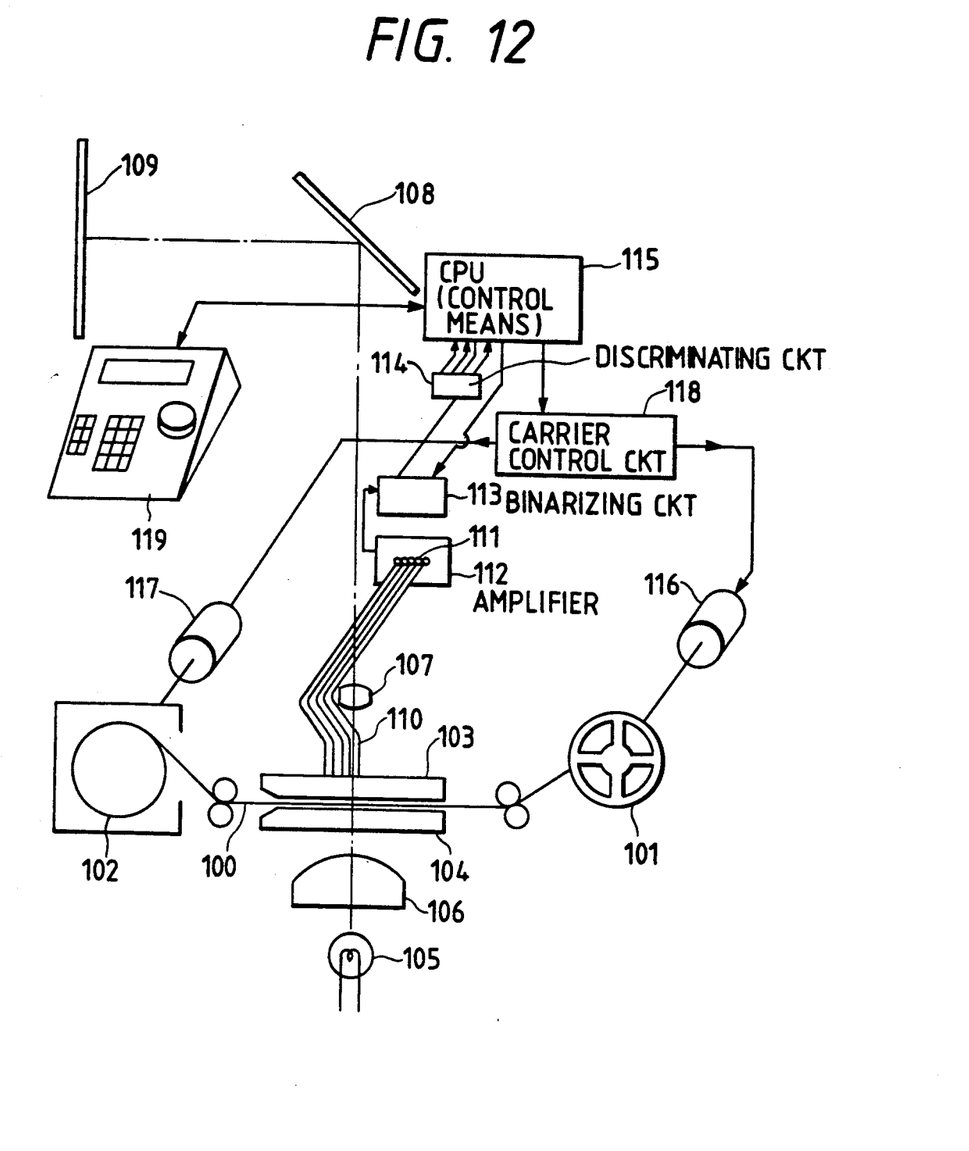
FIG. 12 is a view showing the entire structure of a conventional example.

In FIG. 12, a microfilm retrieving apparatus having a conventional mark detecting apparatus is shown. A microfilm 100 with marks provided corresponding to image frames is fed by the rotation of winding reel 101 and rewinding reel 102 to pass between the glasses 103 and 104 arranged in parallel. Below the glass 104, there are provided a light source 105 and a condenser lens 106, while above the glass 103, a projection lens 107, a mirror 108, and a screen 109.

Also, with the upper surface of the glass 103, the light receiving planes of a plurality of optical fibers 110 are arranged closely in contact. At the other ends of the optical fibers 110, the photoelectric conversion elements are arranged to output electric signals corresponding to the luminous energy drawn by the optical fibers 110. Each of the photoelectric conversion elements 111 is connected to an amplifying circuit 112. Further, the CPU circuit 115 serving as control means is connected to the discriminating circuit 114 and the binarizing circuit 113. The optical fibers 110 and photoelectric conversion elements 111 constitute light receiving means.

To the amplifying circuit 112, a binarizing circuit 113 is connected. Further, a CPU circuit 115 serving as control means is connected to a discriminating circuit 114 and a binarizing circuit 113. The CPU circuit 115 sets the reference values for the binarizing circuit 113.

The aforesaid winding reel 101 and rewinding reel 102 are controlled by the driving of motors 116 and 117. The motors 116 and 117 are driven by a carrier control circuit 118 connected to the CPU circuit 115. In this respect, a reference numeral 119 designates a key board connected to the CPU circuit 115.

With the structure described above, the motor 116 or 117 is driven by operating the key board 119 to feed the microfilm 100 in a given direction. At the same time, the microfilm 100 is irradiated by a light source 105. Then, the transmitting rays of light are drawn by the optical fibers 110 so that electric signals are output from the photoelectric conversion elements 111. After being amplified by the amplifying circuit 112, the electric signals are binarized by the binarizing circuit 113 in relation to the reference values supplied by the CPU circuit 115. Thus, the discriminating circuit 114 discriminates the presence of marks in accordance with the binarized signals and transmits the results to the CPU circuit 115.

When a desired mark is detected, the feeding of the microfilm 100 is suspended through the CPU circuit 115. Hence, the transmitting rays of light from the image frame illuminated by the light source 105 are projected to the screen 109 through the projection lens 107 and mirror 108.

Now, there are the following methods for setting the reference values:

(1) Using a detecting apparatus, that is, variable resistors and others provided for light receiving means, a service person makes a special adjustment. Also, using the data which are prepared by the use of dedicated adjustment tools at a factory or some other location, reference values are established.

(2) Film detecting means different from the light receiving means for mark detection, a reflective sensor or the like, for example, is provided for the microfilm feeding pass. Then, the output signals corresponding to the incident light to the reflective sensor are obtained when there is no microfilm. Utilizing such output signals, the reference values for binarization are defined.

(3) The transmitted rays of light from the portion of a microfilm where no marks are provided, that is, the base portion of the microfilm, are received by light receiving means, and reference values are established on the basis of the luminous energy of light thus received.

However, the following problems are encountered in the above-mentioned conventional examples:

As regards the methods (1), (2), and (3), it is impossible to discriminate the case where the output values are lowered due to the presence of dust or marks between the light receiving means and the light source from the case where the luminous energy of the light source itself varies. As a result, when there are changes in a light source in service, necessitating modifications of the binarized reference data, it is impossible to detect the variations of the luminous energy accurately for the purpose.

When the base density of the film to be used for retrieval is high, the binarized reference data should be optimized in accordance with such a base density. In this case, too, the same problem as above is encountered. Consequently, if the film exists in the feeding pass, it is impossible to modify the binarized reference data. Also, the method (3) results not only in the increased number of light receiving means, leading to an increased cost, but also in the incapability of obtaining any correct outputs when the base density is significantly changed. As a result, there is a possibility that an erroneous detection takes place in either case.

SUMMARY OF THE INVENTION

The present invention is designed to solve the above-mentioned problems, and the object of the invention is to provide a mark detecting apparatus capable of defining the binarized reference values accurately even when the film is in the feeding pass by utilizing the output difference in a plurality of light receiving means.

In order to achieve the above-mentioned object, a mark detecting apparatus according to the present invention, which is provided with a light source for irradiating a marked film; a plurality of light receiving means for receiving the transmitted rays of the irradiated light to output signals corresponding to the luminous energy; a binarizing circuit for binarizing the output signals from the aforesaid plurality of light receiving means on the basis of reference values; discriminating means for discriminating the presence of the aforesaid marks in accordance with the output of the aforesaid binarizing circuit; and control means for defining the aforesaid reference values, is characterized by a structure arranged in such a manner that the aforesaid control means defines the aforesaid reference values on the basis of the data regarding the maximum values and the quasimaximal values of the output signals of the plurality of light receiving means, which are obtained from the film in advance.

Furthermore, the aforesaid control means is of such a structure that when the variations of the output values of the aforesaid plural light receiving means become greater than the variation of the luminous energy of the aforesaid light source itself, the reference values are defined using the output values at the time of the conditions of the aforesaid data being satisfied.

BRIEF DESCRIPTION OF THE DRAWINGS

FIGS. 3A to 3C are graphs showing an embodiment according to the present invention.

FIGS. 4A to 4D are views showing an embodiment according to the present invention.

FIGS. 5A to 5D are views showing an embodiment according to the present invention.

FIGS. 6A to 6C are views showing an embodiment according to the present invention.

FIGS. 7A and 7B are views showing an embodiment according to the present invention.

FIGS. 9A to 9D are views showing an embodiment according to the present invention.

DETAILED DESCRIPTION OF THE PREFERRED EMBODIMENTS

Figure 1:
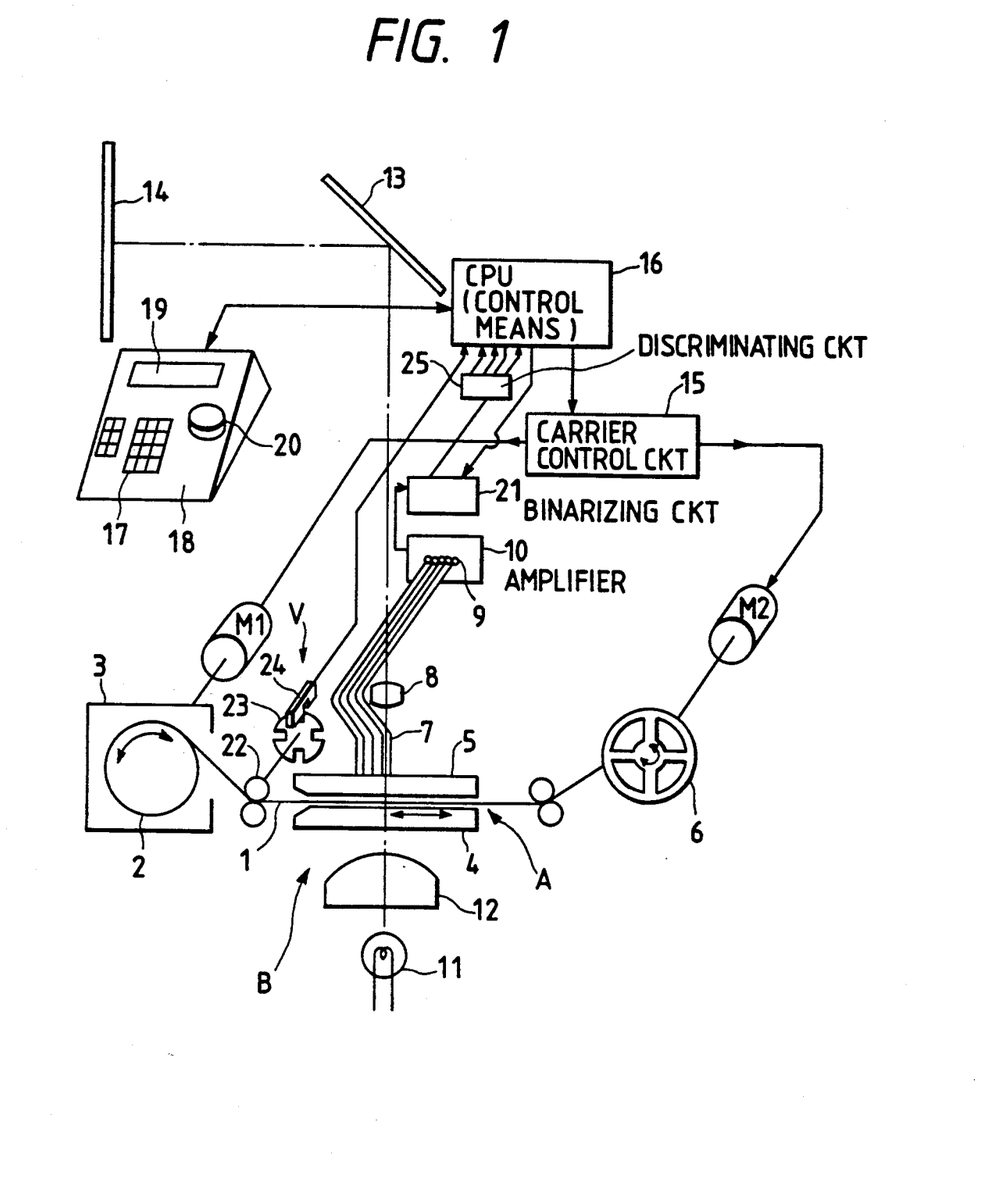
FIG. 1 is a view showing the entire structure of an embodiment according to the present invention.

FIG. 1 shows the structure of a microfilm retrieving apparatus to which the present invention is applied, in which a reference numeral 1 designates a microfilm which is a film having an opaque (high density) portion for marks and a transparent (low density) portion for base; 2, a winding reel for winding the microfilm 1, which is stored in a cartridge 3; and 4 and 5, glasses arranged in parallel, the glasses 4 and 5 being closely in contact with the film to provide parallelism. The glasses 4 and 5 are movable in the width direction using a solenoid and others, and usually in an open state when the film 1 is carried in the directions indicated by an arrow.

A reference numeral 6 designates a winding reel for winding the film 1; 7, the optical fiber portion which is arranged on the upper glass 5 to detect marks, a plurality of optical fibers being arranged at certain pitches in a straight line in the feed direction of the microfilm 1; 8, a projection lens for projecting the images of the microfilm 1 on a screen 14 in enlargement; and 9, a photoelectric conversion element portion comprising phototransistors, photodiodes, and others for converting the transmitted rays of light from the optical fiber portion 7 into electric signals, being arranged at the end of the optical fiber portion 7 oppositely thereto. The abovementioned optical fiber portion 7 and photoelectric conversion element portion 9 constitute light receiving means.

A reference numeral 10 designates an amplifying circuit for amplifying the minute output current from the photoelectric conversion element portion 9; 11, a halogen lamp or the like for illuminating the film; 12, a condenser lens serving as a light-gathering lens; 13, a reflection mirror for guiding the rays of light from the projection lens 8 to a screen 14; 14, a transmitting type screen to the images of the microfilm are projected; 15, a carrier control circuit for controlling a film feeding circuit connected to motors M1, M2, and others. The motors M1 and M2 drive the winding reel 6 and rewinding reel 2 to be rotated. Also, a reference numeral 16 designates a CPU circuit (control means) for controlling the carrier control circuit, mark detections, and key board operations.

In the meantime, on the key board 18, there are provided ten keys and other switches 17 thereby to input the retrieval address instructions for retrieving the images desired. Here, a reference numeral 19 designates a displaying device such as an LED and an LCD provided on the key board 18 to display the odometer values, retrieval addresses, the current state of an automatic retrieving apparatus, and the like, and 20, a control knob on the key board 18 for enabling the film feeding speed of the automatic retrieving apparatus to be adjusted manually.

A reference numeral 21 designates a binarizing circuit connected to the amplifying circuit 10 to compare the output from the amplifying circuit 10 and a binarized reference value from the CPU circuit 16 and output the result of such a comparison to the CPU circuit 16.

A reference numeral 22 designates a guide roller which is rotative in matching with the movement of the film 1 and serves as a film feeding guide; 23, a slit disc mounted on the guide roller 22 which is rotated in synchronism with the guide roller 22; and 24, a photointerrupter serving as a film encoder in cooperation with the function of the slit disc 23 to transmit the feeding speed of the film and other data to the CPU circuit 16 in the form of pulse information.

Figure 2:
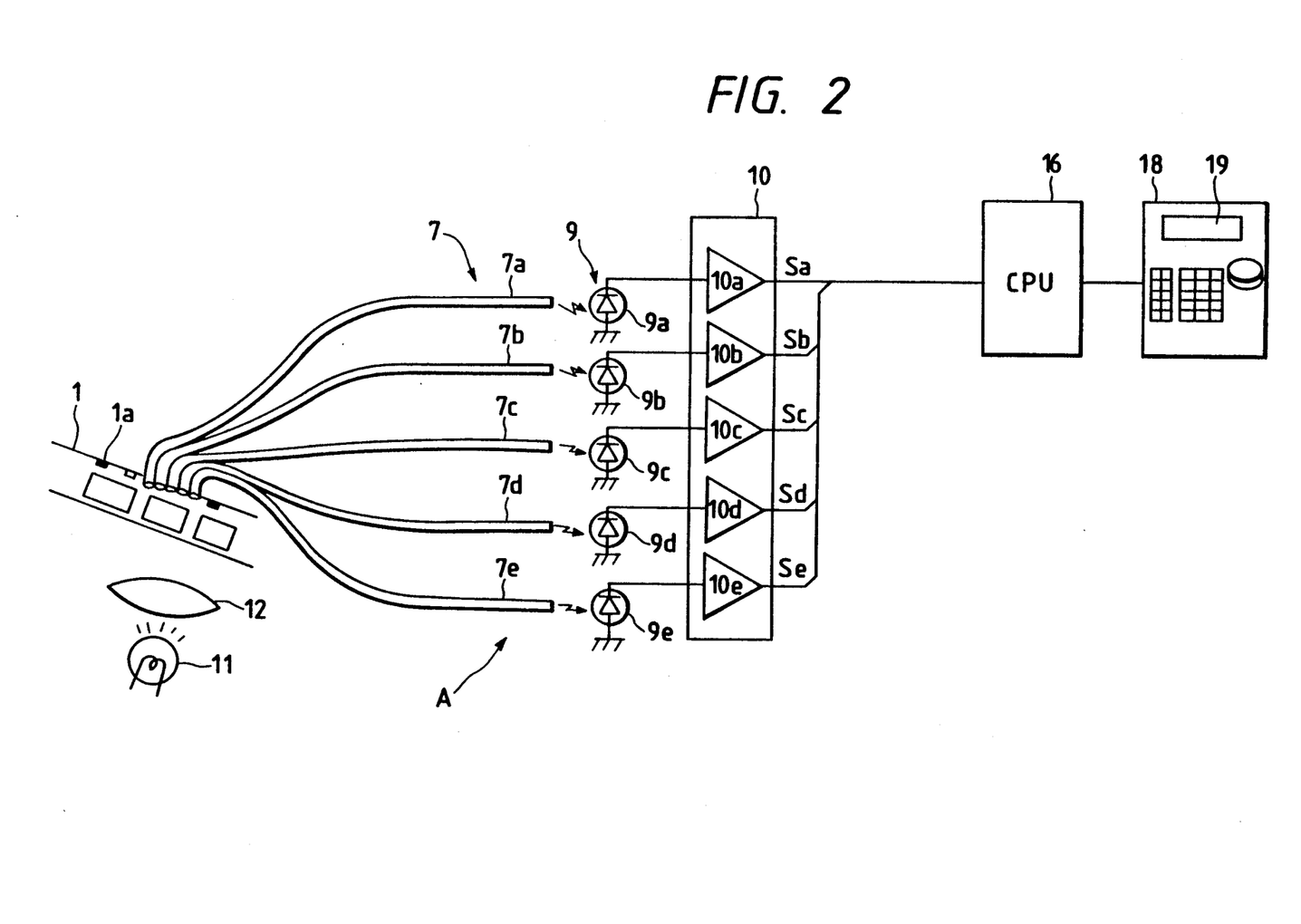
FIG. 2 is a view schematically showing the peripheral details of light receiving means according to the present invention.

A reference numeral 25 designates a discriminating circuit for discriminating the mark sizes by processing the output signals from the binarizing circuit. The operational speed of the discriminating circuit 25 is regulated by the operational clocking output from the CPU circuit 16. The discrimination of the mark sizes is conducted by the discriminating circuit 25 in accordance with each clocking based on the data binarized by the binarizing circuit. Thus, by the mark sizes, the data are converted into signals representing a page mark, a file mark, and a batch mark, and a signal indicating the film feeding to be transmitted to the CPU circuit 16. FIG. 2 is a view for explaining the optical fiber portion 7, photoelectric conversion element portion 9, amplifying circuit 10, and CPU circuit 16 in detail.

The optical fiber portion 7 has a plurality of optical fibers 7a, 7b, 7c, 7d, and 7e which are individually separated and each optical fiber guides the rays of light which have been drawn to each of the corresponding photoelectric conversion elements (hereinafter referred to as photosensor) 9a, 9b, 9c, 9d, and 9e, respectively. The values of the currents output from the photoelectric conversion element portion 9 are amplified by the amplifying circuit 10, respectively, and at the same time, are converted into digital signals by A/D converters 10a to 10e in the amplifying circuit 10 and are inputted into the CPU circuit 16 as output signals Sa, Sb, Sc, Sd, and Se so as to enable the CPU 16 to process them.

The optical sensors 9a to 9e output large current values when receiving the transmitted rays of light from the base (transparent) portion of the film and output small current value for the transmitted light from a mark (opaque) 1a.

Here, the output current value from each of the photosensors 9a to 9e varies by the fluctuations of the source voltage and others of the film illumination light source 11. Therefore, the output of each of photosensors is sampled several times at certain time intervals, and the maximum output value is extracted from the outputs thus sampled.

Figure 8:
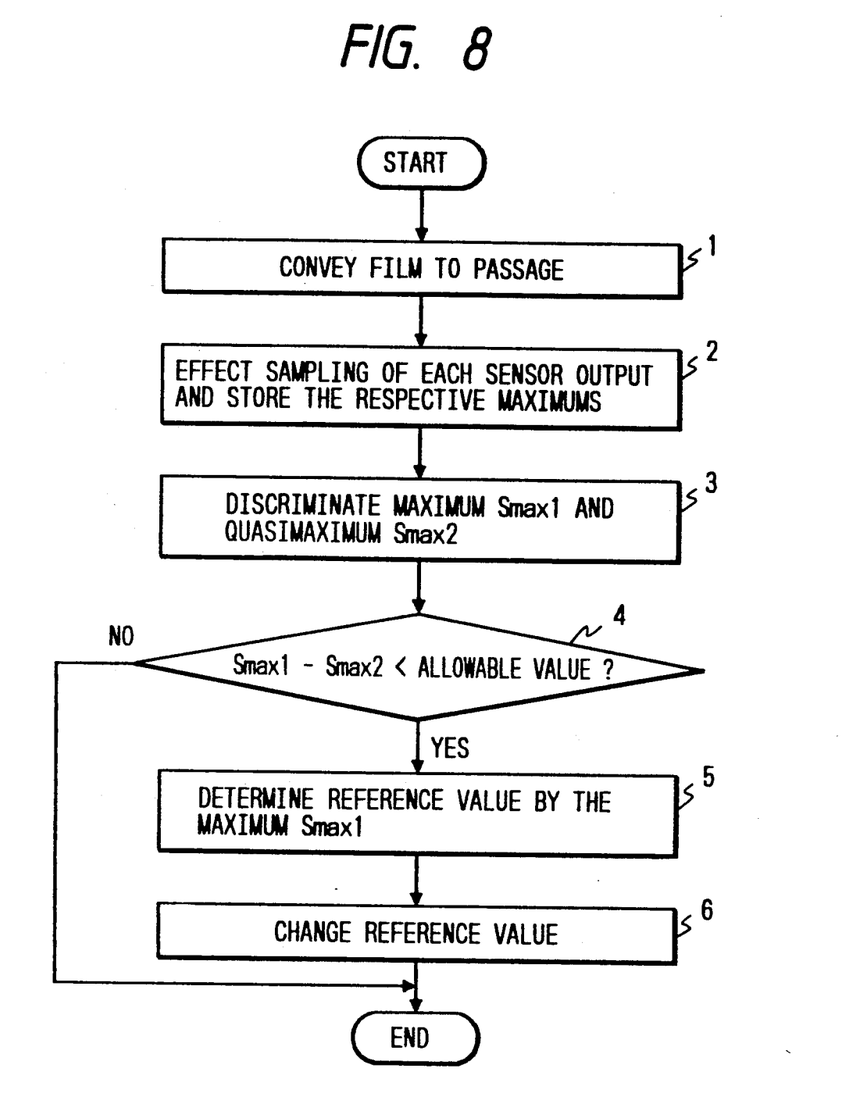
FIG. 8 is a flowchart showing an operation according to the present invention.
Figure 9A:
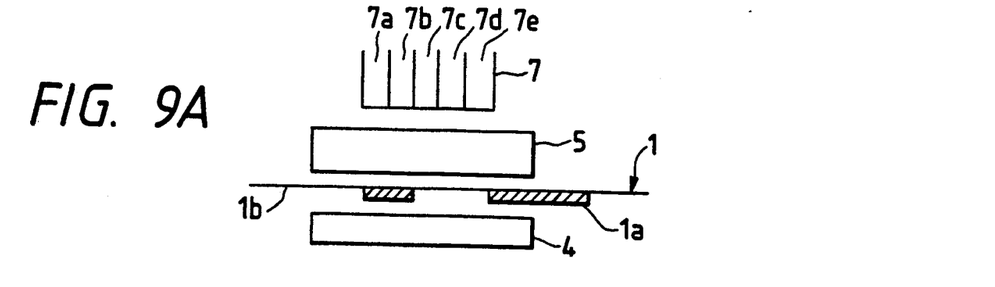
FIGS. 9A, 9B, 9C, and 9D show the amount of movement of a microfilm and the output example resulting from the variation of luminous energy.
Figure 9B:
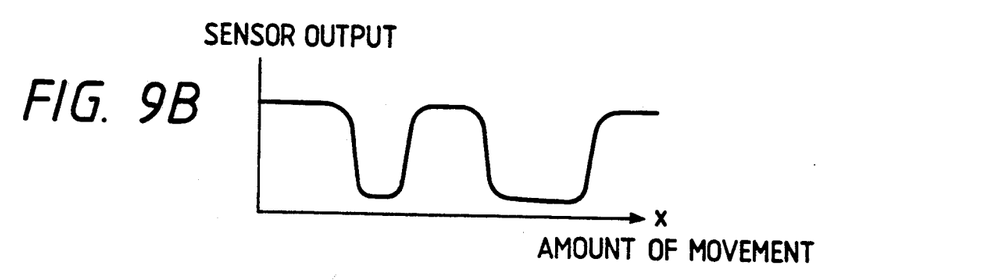
Figure 9C:
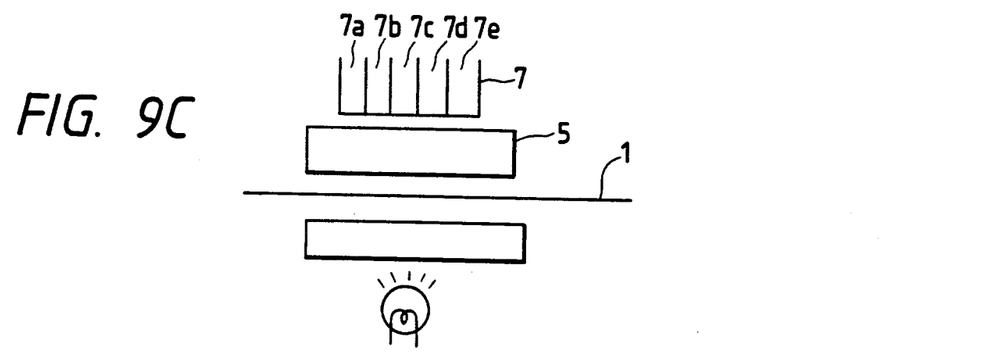
Figure 9D:
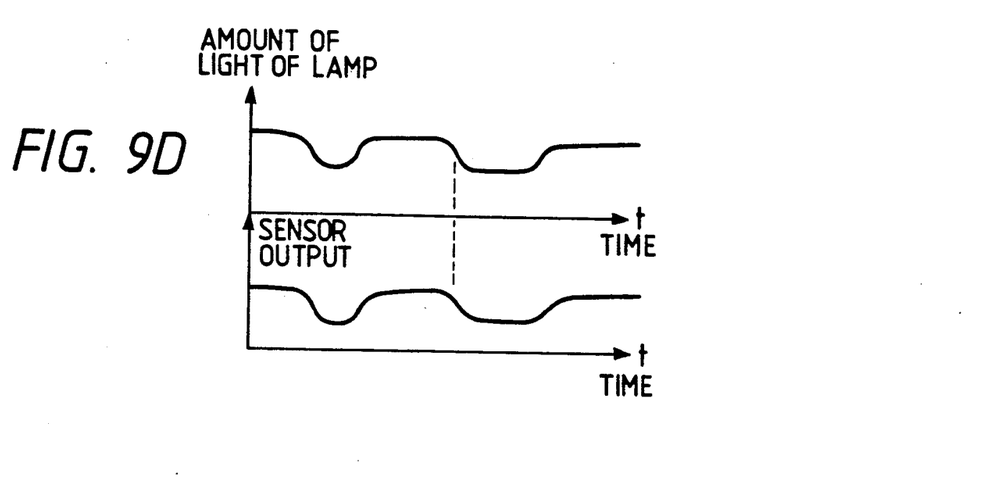

FIG. 8 is a flowchart showing the operation to define the reference values.

At first, the film is fed into the feeding passage. The film is arranged at the detecting position of each of the photosensors (step 1). The output value of each of the photosensors 9a to 9e is sampled several times at certain time intervals (step 2). Of those sampled, the maximum output value of each of the photosensors is stored in the memory in the CPU circuit 16 as $Sa_{max}$, $Sb_{max}$, $Sc_{max}$, $Sd_{max}$, and $Se_{max}$, respectively.

Then, of the data thus stored, the maximum value $S_{max1}$ and the quasimaximal value $S_{max2}$ are determined (step 3), and whether $S_{max1}$-$S_{max2}$ is larger or smaller than a given allowable value or smaller is determined (step 4).

If $S_{max1}$-$S_{max2}$ is smaller than the allowable value, the condition thus detected is considered normal and a binarized reference value is set on the basis of the maximum value $S_{max1}$ obtained in this way. In other words, if the $S_{max1}=S_1$ in the conversion table graphed in FIG. 3B, a value at $SL_1$ on the axis of ordinate, which corresponds to the $S_1$ on the axis of abscissa on the straight line f of the conversion table, is defined as the reference value (step 5), and then the last reference value already set in advance will be modified (step 6). Thus, this newly defined reference value $SL_1$ is made a binarizing value for the binarizing circuit 21 thereby to discriminate the presence of marks.

Also, if the $S_{max1}$-$S_{max2}$ is found greater than the allowable value, the condition thus detected is considered abnormal, and no reference value will be modified. Thus, the reference value already set is made a binarizing value for each of the photosensors.

With repetition of the above-mentioned operation periodically, it is possible to define appropriate reference values at all times to detect the marks correctly.

In this respect, the aforesaid allowable value is set at a given value within an allowable range of the fluctuations of the photosensors, amplifier, and the like. In general, it should suffice if the value is defined within approximately 5% of the maximum output value.

Now, the description will be made of the extraction of the maximum output value of each sensor by means of sampling.

The film illumination source 11 fluctuates approximately 10% due to light source replying and others. The CPU circuit 16 is, therefore, required to conduct several samplings at certain intervals. The maximum value thus obtained is used as a reference value for the binalizing circuit 21. Now, if the power source frequency is 50 Hz, the luminous energy of the lamp changes at 100 Hz. If a sample frequency is 1,000 Hz, it is possible to conduct a sampling at the maximal portion of the changing luminous energy of the lamp, but if the sample frequency is slow, there is a possibility that it is only possible to conduct sampling where the luminous energy is small when the sample frequency is in synchronism with the frequency of the changing luminous energy of the lamp in the light source 11.

In order to prevent this, the structure should be arranged so that the relation between the frequency of changing luminous energy, sample frequency, and sampling number N satisfies the following condition; thus, given the changing frequency of the luminous energy as f1 and the sample frequency as f2:

$$(m/f2 - k/f1) \times N = 1/f1 \ (k \ and \ m = 1,2,3...)$$

where k and m are arbitrarily natural number, respectively.

Now, for example, if the sampling number is ten times and the frequency of changing luminous energy f1 is 100 Hz, the sample frequency f2 will be:

$$f2 = 1,000 \ m/(1 + 10 \ k)$$

and then assuming that m=1 and k=1, $$f2 = 90.9 \ Hz.$$

Thus, it becomes possible to avoid samplings at the same point in the changing cycle of the luminous energy if the samplings are conducted at this frequency.

In this respect, the reason why the maximum value of the photosensors is used as the data for the reference value is that whereas a minimum value and an averaged value can vary considerably freely by the effect, of dust and other factors, maximum value cannot be greater than the maximum value of the light source luminous energy.

Now, for example, the maximum output value of the photosensors is used. There may be some case where the output is locally lowered due to dust, but the maximum output value of the photosensors at the locations where no dust, exists is greater than the output values affected by the existing dust. Thus, the data available from the location where no dust exists are adopted.

However, if minimum value of the outputs of the photosensors is used for the purpose, the data obtainable in a normal condition where no dusts exists show a greater value than the data obtainable from the output which has been affected by dust when the outputs are locally lowered by the existence of dust; hence making the data inaccurate.

Also, when an averaged value is used for the purpose, the accuracy is still low as compared with the use of the maximum value because the original data may include those the output of which is lowered due to existing dust.

Now, using the data on the maximum value obtained by the above-mentioned method for each of the photosensors in a state where no film is present, it becomes possible to represent the variations taking place on the film as the variable ratio from the data on the maximum values without being affected by the fluctuation of each photosensor and fluctuation of the optical fiber portion 7.

Figure 10:
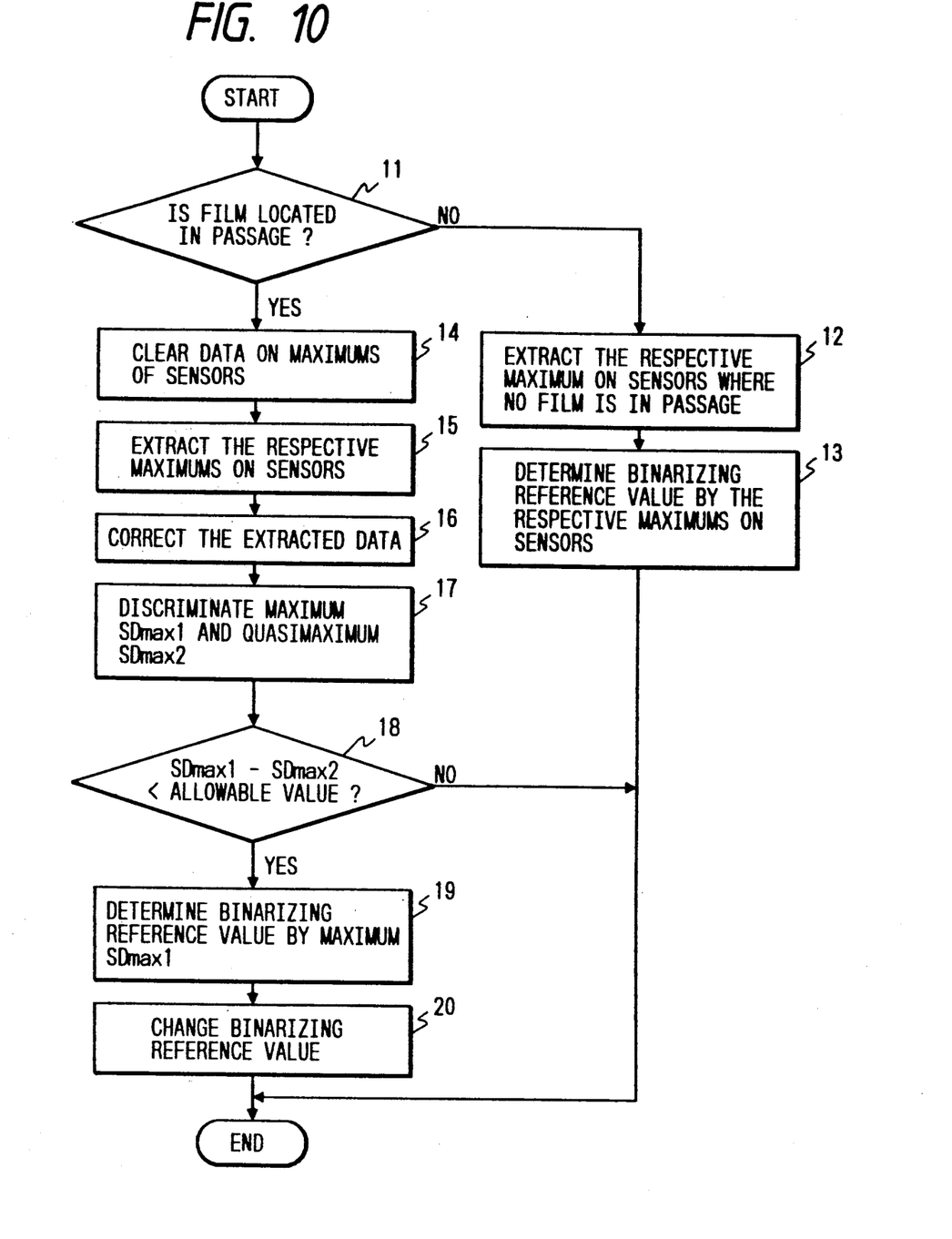
FIG. 10 and FIG. 11 are flowcharts showing the operations of another embodiment according to the present invention.

FIG. 10 is a flowchart showing the process to set the reference value in consideration of the above-mentioned fluctuations.

At first, the maximum output values $Sa_{max}$, $Sb_{max}$, $Sc_{max}$, $Sd_{max}$, and $Se_{max}$ of the respective photosensors are extracted without any film in the passage and stored in the memory (steps 11 and 12).

The data extracted without any film in the passage and stored in the memory are needed for the consideration of the fluctuation and the like of each of the photosensors 9a to 9e. For the initial binarizing reference values SL, the next data have not been extracted as yet. Therefore, utilizing the maximum values $Sa_{max}$, $Sb_{max}$, $Sc_{max}$, $Sd_{max}$, and $Se_{max}$, the values on the axis of ordinate, corresponding to the $Sa_{max}$, $Sb_{max}$, $Sc_{max}$, $Sd_{max}$, and $Se_{max}$ with respect to the straight line f in the conversion table graphed in FIG. 3B, are made the reference value for each of the photosensors (step 13).

Figure 3A:
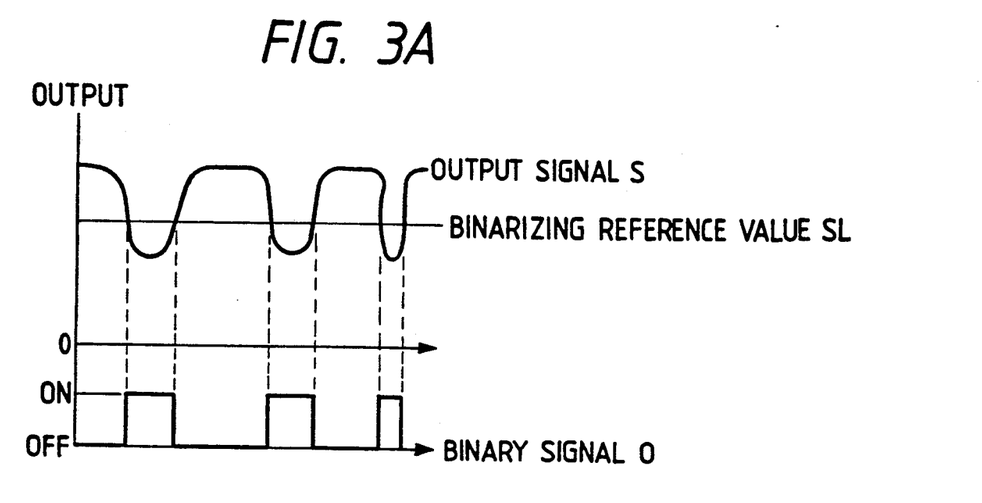
FIG. 3A is a graph showing an example of the binarization of the output from a photoelectric conversion element in accordance with a correctly binarized reference value.
Figure 3B:
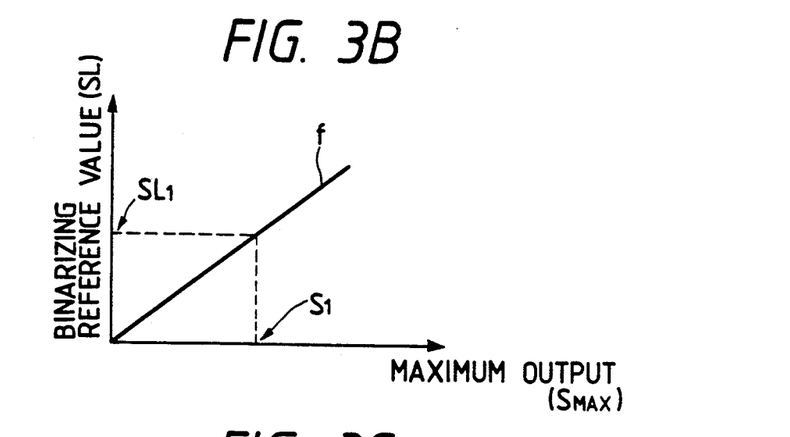
FIG. 3B is a graph showing a conversion table for defining the binarizing reference value from a maximum output value.

Then, when the film is fed to a position where the mark 1a is actually located opposite to the photoelectric conversion element portion 9, each output of the photosensors 9a to 9e is significantly different according to the case where the mark is being detected or where it is not detected as shown in FIG. 3A.

Figure 3C:
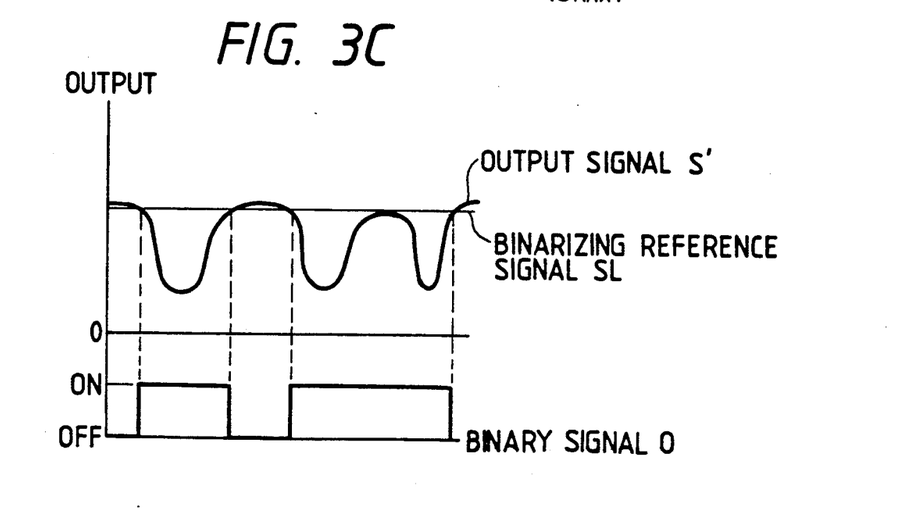
FIG. 3C is a graph showing an example of the binarization of the output from a photoelectric conversion element in accordance with an incorrectly binarized reference value.

If these are binarized using the binarization reference value SL defined by the aforesaid method, each output signal S of the photosensors indicates that the binarization has been performed accurately. However, if the luminous energy of the light source 11 is greatly lowered, the binarization of the output signal S' cannot be performed accurately by the use of the initially defined binarizing reference value SL as it is as shown in FIG. 3C.

If the light source 11 has changed, such as this, the initially defined binarizing reference value cannot be utilized; hence there is a need for defining a binarizing reference value anew. Hereunder means required therefor will be described. At first, the maximum output values Sa, Sb, Sc, Sd, and Se of the respective photosensors 9a to 9e are extracted with a film being present in the passage (steps 14 and 15).

The output data Sa, Sb, Sc, Sd, and Se of the photosensors 9a to 9e are divided by the maximum output value of each sensor $Sa_{max}$, $Sb_{max}$, $Sc_{max}$, $Sd_{max}$, and $Se_{max}$ obtained without the presence of the film and stored in the memory to correct each output value of the sensors. The data thus obtained by this correction indicate the alternating variable ratio for the maximum output value of each of the photosensors 9a to 9e, and it is possible to compare the changes in the luminous energy of the lamp 11 and the variable ratio for the amount of incident light to each photosensor resulting from the retrieval mark in accordance with the size, large or small, of the correcting data without being affected by any output difference due to the fluctuations of the sensitivity of the respective photosensors 9a to 9e. This correcting data has a large value in the low density area where no mark is present, that is, the base portion of the film while it has a small value in high density area where a mark is present.

In this way, the fluctuations of the characteristics of the photosensors 9a to 9e and the output difference in each of the photosensors 9a to 9e are corrected (step 6). Now, given the correcting data as Sareg, Sbreg, Screg, Sdreg, and Sereg, the relations of each data will be as follows:

Sareg = Sa/Samax, Sbreg = Sb/Sbmax,

Screg = Sc/Scmax, Sdreg = Sd/Sdmax, and

Sereg = Se/Semax

Subsequently, the correcting data Sareg to Sereg for each of the photosensors 9a to 9e are sorted sequentially in the order of size to obtain the correcting data of the maximum value and the next largest data having the quasimaximal value which have been sorted in such a manner. These values are given as $SD_{max1}$ and $SD_{max2}$ (step 17).

Here, the output correcting data for the sensors detecting the film base portion where no retrieval mark exists indicate the values larger than the data for the sensors detecting the other portion of the film. Accordingly, the two data having the maximum value and quasimaximal value of the output correcting data are most probably for the film base portion where no mark is present.

Also, in general, as compared with the portion having marks, the film density of the base portion of a microfilm changes less, and in a structure such as this in which optical fibers 7a to 7e are arranged side by side, the intervals between the optical fibers are small. As a result, the output variable ratio between each of the sensors becomes uniformly equal.

Now, when the maximum value and quasimaximal value of the output correcting data on the corrected output from a plurality of sensors obtained under the above-mentioned two conditions, there is no problem that the two sensors having these values are assumed to be on the base portion of the film if the two values are the same or there is only a minute difference between these two values.

In practice, even when both sensors detect the base portion of a film, a slight deviation takes place because there exists slight errors in the photosensors, amplifier, and the like. Therefore, if the reference values should be defined in consideration of this deviation, such reference values will be established in accordance with the conditions given below.

Whether ($SD_{max1}$-$SD_{max2}$) is greater or smaller than an allowable value is determined in step 18.

If the ($SD_{max1}$-$SD_{max2}$) is smaller than the allowable value, the binarizing reference values SLa, SLb, SLc, SLd, and SLe for the respective photosensors are determined by the values SL on the axis of ordinate corresponding to the maximum values of correcting data for each of the photosensors $Sa_{max} \times SD_{max1}$, $Sb_{max} \times SD_{max1}$, $Sc_{max} \times SD_{max1}$, $Sd_{max} \times SD_{max1}$, and $Se_{max} \times SD_{max1}$ on the straight line f in the conversion table graphed in FIG. 3B (steps 19 and 20). With the above, the binarizing reference value for each of the photosensors is updated to a new value.

Figure 4A:
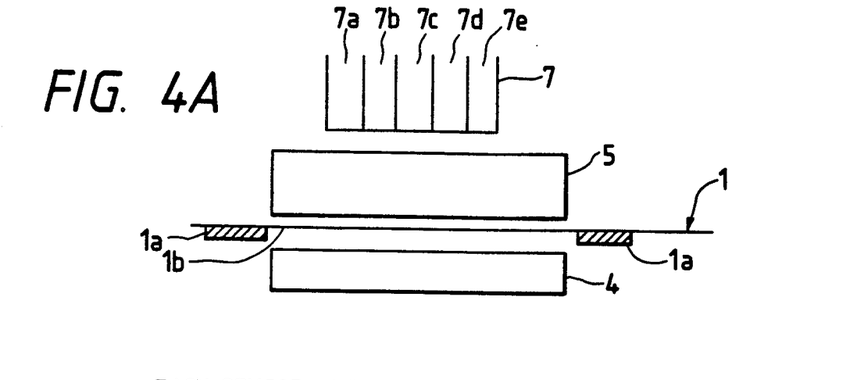
FIGS. 4A, 4B, 4C, and 4D show the state that two or more optical fibers are arranged at a position corresponding to the base portion and the output example of each of the photoelectric conversion elements.
Figure 4B:
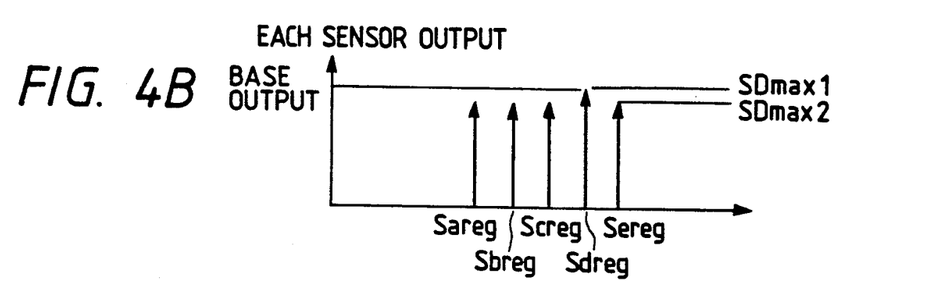
Figure 4C:
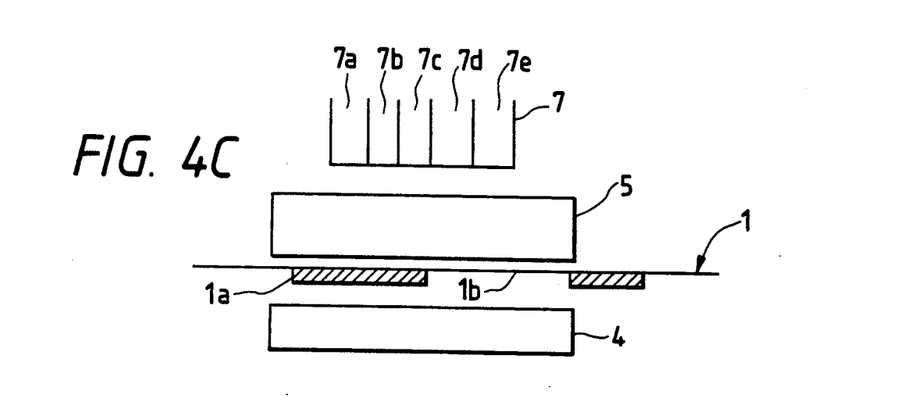
Figure 4D:
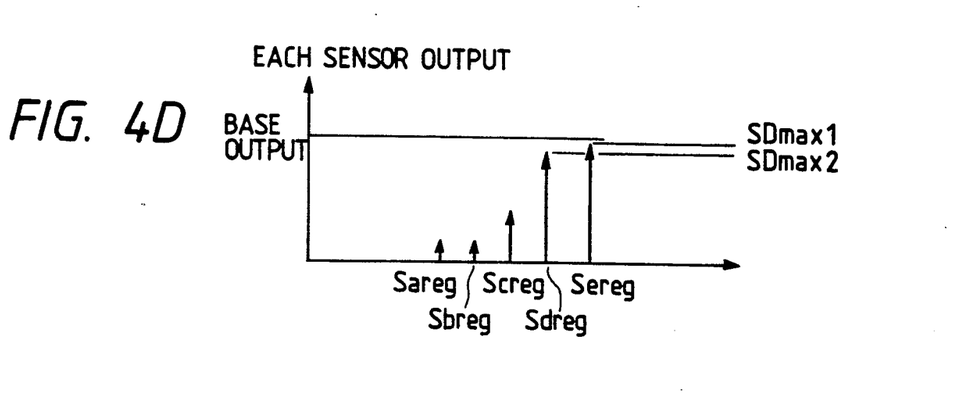

Now, as shown in FIG. 4C, if 7a to 7c of five optical fibers 7a to 7e exist at positions corresponding to the base portion 1b of a film 1, the output data of each of the photosensors 9a to 9e differ greatly as shown in FIG. 4D as to the sensors 9a, 9b, and 9c covering the mark 1a and the sensors 9d and 9e covering the base portion 1b. However, the maximum value and quasimaximal value of the output data are taken from the values obtainable from the rays of light given to the optical fibers 7a to 7e which are located over the base portion 1b. Therefore, the relations, ($SD_{max1}$-$SD_{max2}$) is smaller than allowable value is satisfied. Thus, the base density at this time is substantially equal to the $SD_{max1}$. Also, then, the output of the photosensors detecting the mark 1a becomes substantially the same as $SD_{max1}$ when detecting the base portion 1b following the movement of the film 1 accordingly. Thus, the binarizing reference value for each of the sensors SLa, SLb, SLc, SLd, and SLe is defined by the reference value SL on the axis of ordinate corresponding to the maximum value of the correcting data on the straight line f of the conversion table graphed in FIG. 3 as described earlier.

Figure 5A:
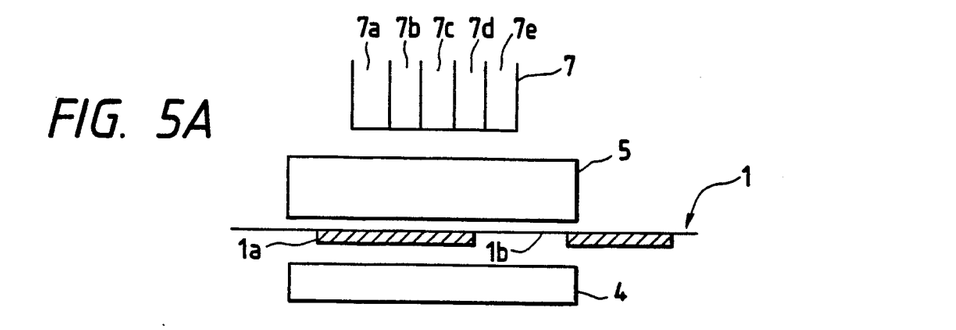
FIGS. 5A, 5B, 5C, and 5D show the state of four or more optical fibers arranged at a position corresponding to the mark and the output example of each of the photoelectric conversion elements.
Figure 5B:
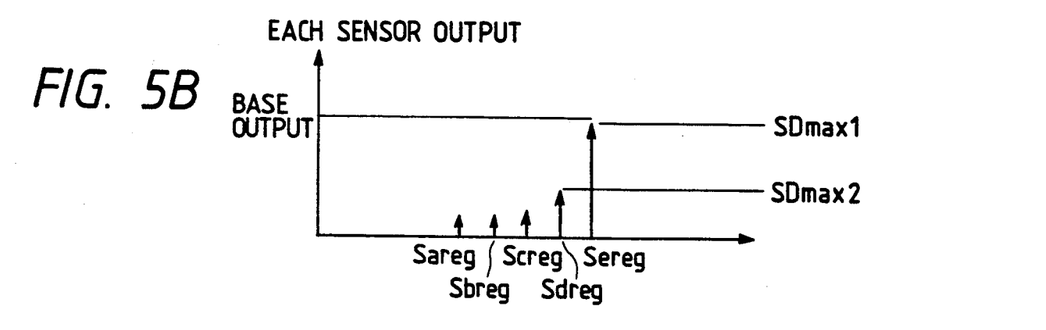
Figure 5C:
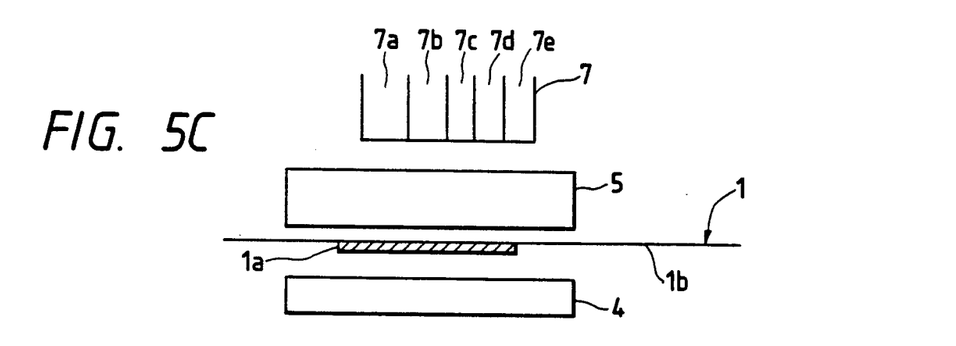
Figure 5D:
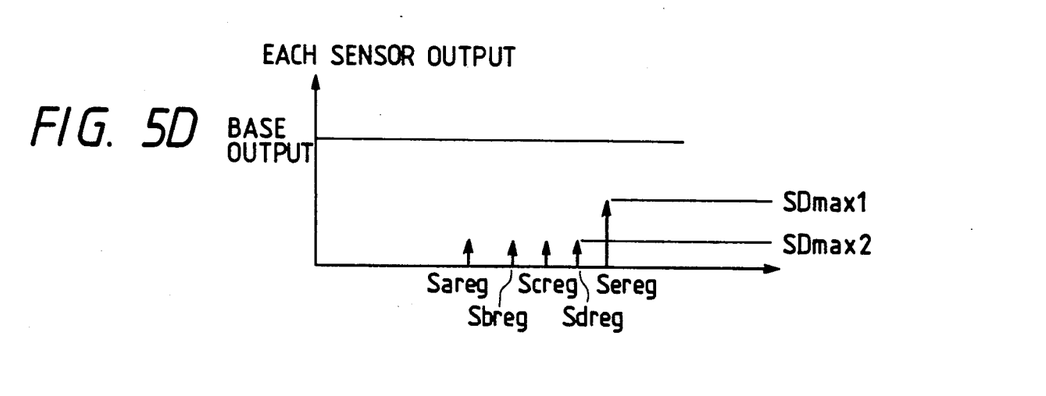

Now, as shown in FIG. 5A, if four optical fibers 7a to 7d are located at a position to cover the mark 1a, the output of the photosensor 9e detecting the base portion 1b becomes high as shown in FIG. 5B. The output values of the other photosensors 9a to 9d are low due to the mark 1a. Therefore, the maximum value and quasimaximal value of the output data of the respective photosensors 9a to 9e show the relations, ($SD_{max1}$-$SD_{max2}$) is larger than allowable value (step 8) and become the values greater than the allowable value. In this case, if all the optical fibers 7a to 7e detect the mark 1a as shown in FIG. 5C, there may occur some case that the $SD_{max1}$ cannot be regarded as equal to the base density. Therefore, any modification of the binarizing reference value is conducted.

As an effect of the above-mentioned embodiment, the binarizing reference value can be defined for each of the photosensors accurately even if the luminous energy of the light source 11 fluctuates. Also, even when the base density of the film 1 changes, the correct value of the binarizing reference can be established reliably. As a result, the probability that the marks are erroneously retrieved is significantly reduced.

Figure 11:
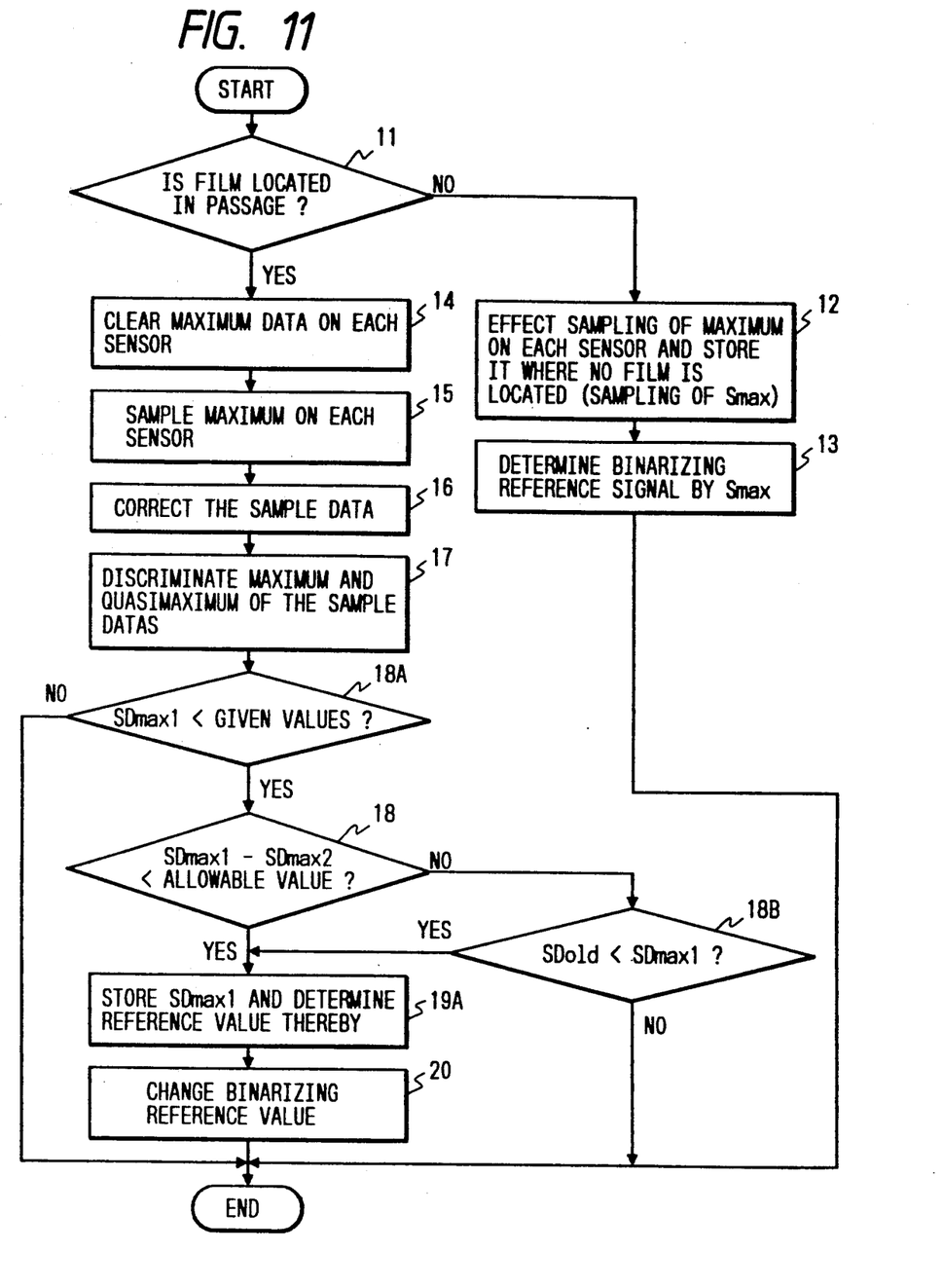

FIG. 11 is a flowchart for another embodiment set forth below. The steps having the same reference marks as FIG. 10 are those in which the same operations are executed.

Second Embodiment

Fundamentally, the maximum output value of the photosensors with the film 1 being in the feeding passage A corresponds to the base portion 1b of the film 1. This output value of the photosensors may be made lower than the original output value of the base itself due to the presence of the marks, dust, and the like. However, unless the luminous energy of the light source 11 is increased, the maximum value of the correcting data will not be increased.

Figure 6A:
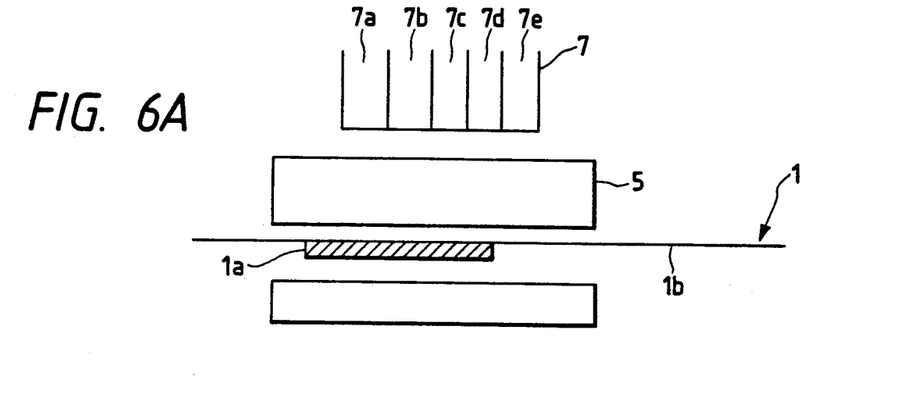
FIGS. 6A, 6B, and 6C show the state that one optical fiber is arranged at a position corresponding to the base portion and the output example of each of the photoelectric conversion elements.
Figure 6B:
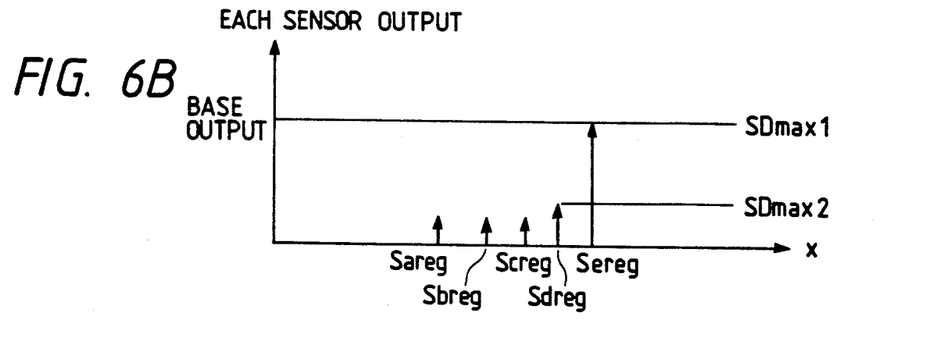

Here, if this character is utilized as another embodiment for the detection of the mark 1a by four optical fibers 7a to 7d as in FIG. 6A, the output of the photosensor 9e which indicates the maximum value becomes high as shown in FIG. 6B. The output values of other photosensors 9a to 9d become low due to the presence of the mark 1a. Therefore, the maximum value and quasimaximal value of the output data of each of the sensors at this time represent the following relations:

($SD_{max1}$-$SD_{max2}$) is larger than allowable value Thus, they are greater than the allowable value.

Figure 6C:
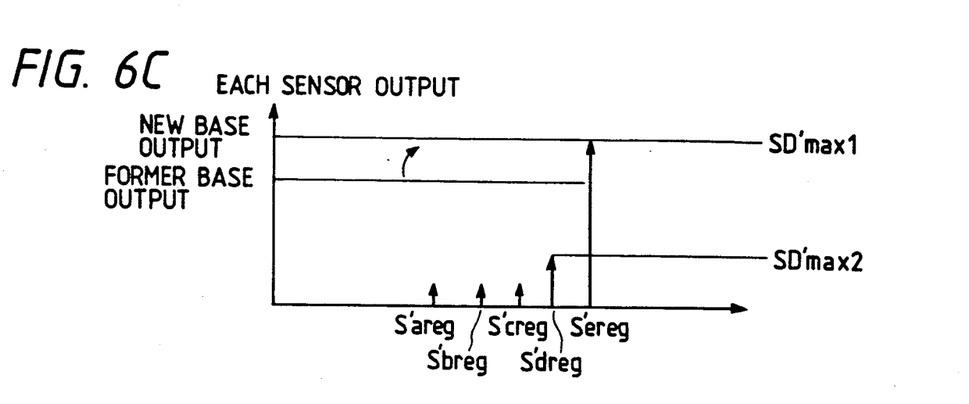

In this case, the structure is arranged so that in step 19A, the value of the last $SD_{max1}$ is stored as $SD_{old}$, and the newly extracted $SD_{max1}$ here is compared with such a stored value. As described earlier, the maximum value is not increased unless the luminous energy is increased. If, therefore, the newly extracted $SD_{max1}$ indicates a value greater than the last $SD_{max1}$ as shown in FIG. 6C (step 18B), it becomes possible to follow the fluctuations of the luminous energy of the light source 11 accurately by modifying the binarizing reference value of each photosensor (steps 19A and 20) with the utilization of the newly extracted $SD_{max1}$ even when the condition ($SD_{max1}$-$SD_{max2}$) is smaller than allowable value is not satisfied.

Third Embodiment

Figure 7A:
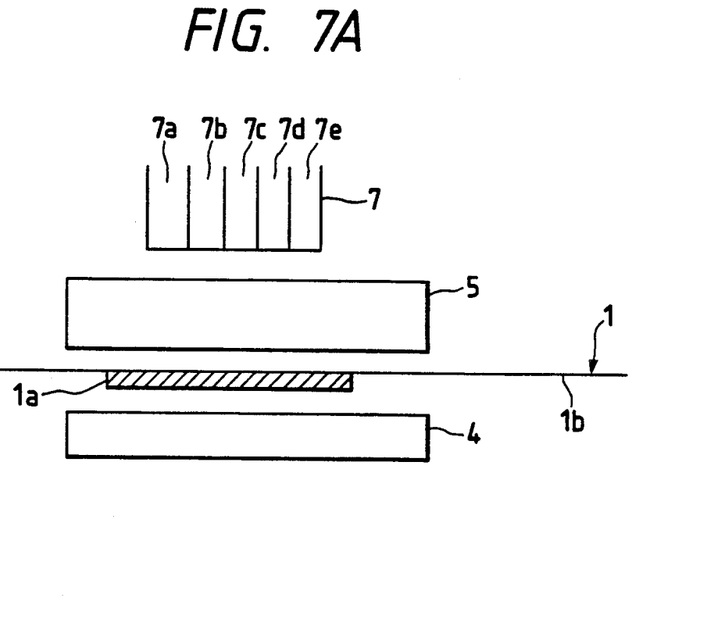
FIGS. 7A and 7B show the state that all the optical fibers are arranged at a position corresponding to the mark and the output example of each of the photoelectric conversion elements.
Figure 7B:
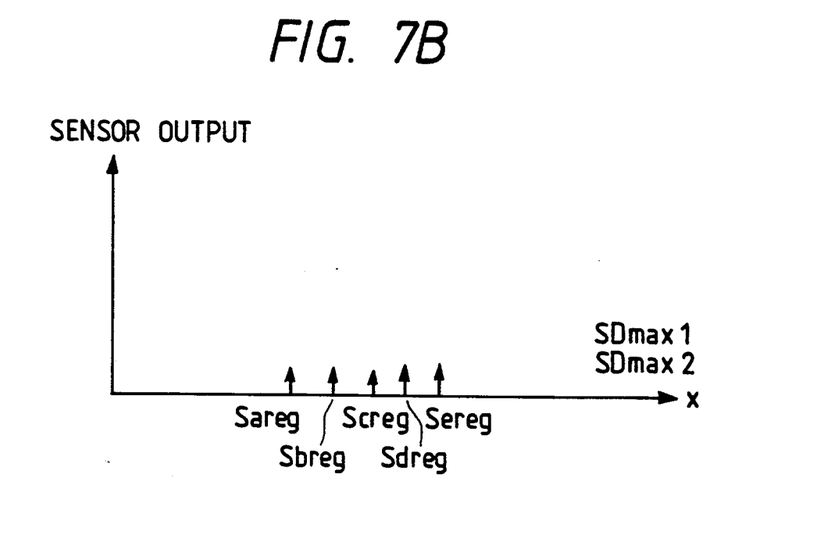

As shown in FIG. 7A, when the optical fibers 7a to 7e are all in a state of detecting the mark 1a, the outputs of all the photosensors 9a to 9e are even due to the presence of the mark 1a as shown in FIG. 7B. Consequently, the maximum value and quasimaximal value of the output data on each of the photosensors 9a to 9e show the following relation:

($SD_{max1}$- $SD_{max2}$) is smaller than allowable value. Thus, they are smaller than the allowable value and satisfy the required condition. The luminous energy of the light source 11 practically used does not change conspicuously. Apparently, the lowest luminous energy at the time the luminous energy of the light source 11 has changed exceedingly is smaller than the output variation of the photosensors at the time of detecting a mark.

Therefore, it is possible to avoid establishing any erroneous binarizing reference values when all the photosensors detect a mark by making an arrangement so that any binarizing reference values are not modified unless the minimal luminous energy when the luminous energy of the light source 11 varies does not satisfy the condition of a given regulation value, $SD_{max1}$ is larger than the regulation value (step 18A).

When the photosensors cannot satisfy the condition on which to establish a binarizing reference value, there is a possibility that the binarizing reference value is deviated if it is adopted as it is. Therefore, if the feeding speed of the film 1 is increased when a retrieval operation is started, such a possibility to conduct an erroneous retrieval will be increased. If, however, the operation is executed slowly, the possibility of erroneous retrieval becomes less. Then, when the film 1 is fed to allow the photosensors to be away from the position where the mark 1a is present and enable them to detect the base portion 1b, the condition required for the photosensors to establish the binarizing reference value will be satisfied. As soon as the condition is satisfied, the speed at which to feed the film 1 is increased; hence making it possible to solve this problem. The feeding speed of the film 1 can be adjusted by operating the control knob 20.

Since the present invention is structured such as set forth above, it is possible to establish the binarizing reference value of the photosensors accurately even when the fluctuation of the luminous energy of the light source occurs. Also, it is possible to correctly establish the binarizing reference value reliably even when the base density of the film varies. Therefore, the possibility of conducting erroneous mark detections will be significantly reduced. Furthermore, there is no need for any special installation of photoelectric conversion elements outside the feeding passage for defining any reference values as required in another conventional example; hence making it possible to reduce the number of parts as well as installation processes, leading to a significant cost reduction.

In this respect, the maximum values and quasimaximal values are extracted in the above-mentioned embodiments, but if a film having transparent (low density) marks with the opaque (high density) base portions surrounding them is used, the reference values are defined by extracting the minimum values and quasiminimal values.

What is claimed is:

1. A mark detecting apparatus, comprising:
   illuminating means for illuminating a film with marks having a density different from a density of its periphery;
   light receiving means for receiving light transmitted through the film illuminated by said illuminating means to detect the presence of the marks, said light receiving means including a plurality of photosensors arranged in a feeding direction of the film and producing output signals;
   setting means for establishing a reference value on the basis of a maximum value and a quasimaximal value among each of the output signals of said photosensors; and
   means for discriminating the presence of the marks by comparing the reference value established by said setting means and the outputs of said light receiving means.

2. A mark detecting apparatus according to claim 1, wherein the reference value is established in accordance with a difference between the maximum value and the quasimaximal value.

3. A mark detecting apparatus according to claim 2, wherein the reference value is established in accordance with the maximum value when the difference is smaller than a given value.

4. A mark detecting apparatus according to claim 2, wherein the reference value is set for a predetermined reference value when the difference is greater than a given value.

5. A retrieving apparatus for retrieving desired images on a film with images and marks recorded, comprising:
   feeding means for feeding a film along a given passage;
   a plurality of photosensors arranged to sequentially detect the marks on the film being fed and output signals based on the detection;
   storage means for storing a maximum value of the output signal of each said photosensor, respectively;
   setting means for setting reference values in accordance with the values stored in said storage means;
   discriminating means for discriminating the presence of marks by comparing the reference value established by said setting means and the output of each photosensor; and
   means for controlling said feeding means to stop in accordance with the marks discriminated by said discriminating means.

6. A retrieving apparatus according to claim 5, wherein the reference value is established in accordance with the maximum value of each value stored in said storage means.

7. A retrieving apparatus according to claim 5, wherein the values stored in said storage means are modified by a given cycle.

* * * * *

UNITED STATES PATENT AND TRADEMARK OFFICE
CERTIFICATE OF CORRECTION

PATENT NO. : 5,245,199
DATED : September 14, 1993
INVENTOR(S) : Okitsu

It is certified that error appears in the above-indentified patent and that said Letters Patent is hereby corrected as shown below:

COLUMN 4:

Line 38, "to the" should read --to which the--.

COLUMN 6:

Line 43, "number," should read --numbers--.
Line 45, "ten times" should read --ten--.
Line 61, "can, vary" should read --can vary-- and "effect," should read --effect--.

COLUMN 7:

Line 57, "changed," should read --changed--.

COLUMN 8:

Line 62, "exists" should read --exist--.

Signed and Sealed this

Thirtieth Day of August, 1994

Attest:

BRUCE LEHMAN

*Attesting Officer*   *Commissioner of Patents and Trademarks*